Nov. 10, 1931.   O. U. ZERK   1,831,086
UNIVERSAL PANORAMIC TRIPOD
Filed Sept. 19, 1927   5 Sheets-Sheet 1
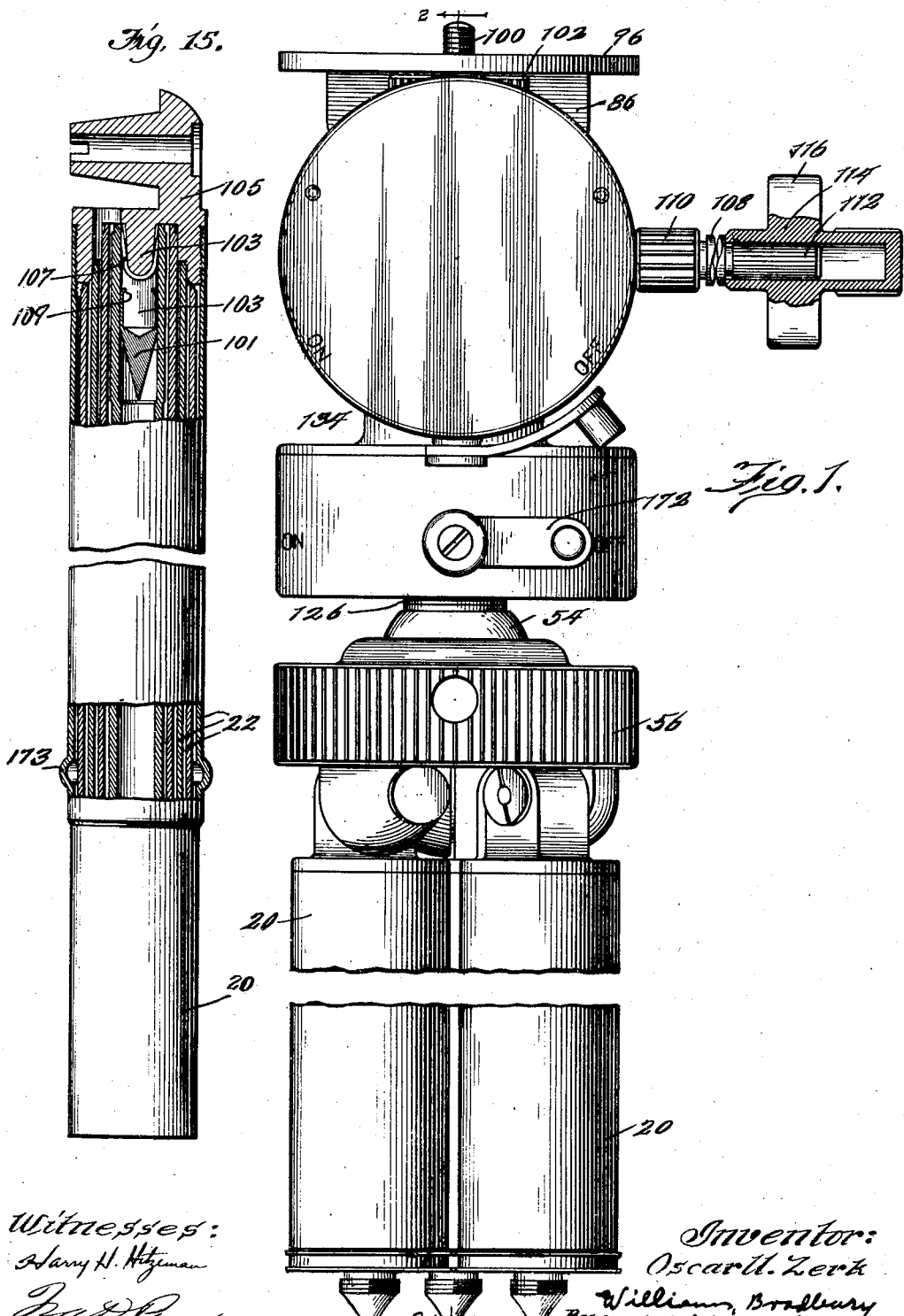

Nov. 10, 1931.   O. U. ZERK   1,831,086
UNIVERSAL PANORAMIC TRIPOD
Filed Sept. 19, 1927   5 Sheets-Sheet 2
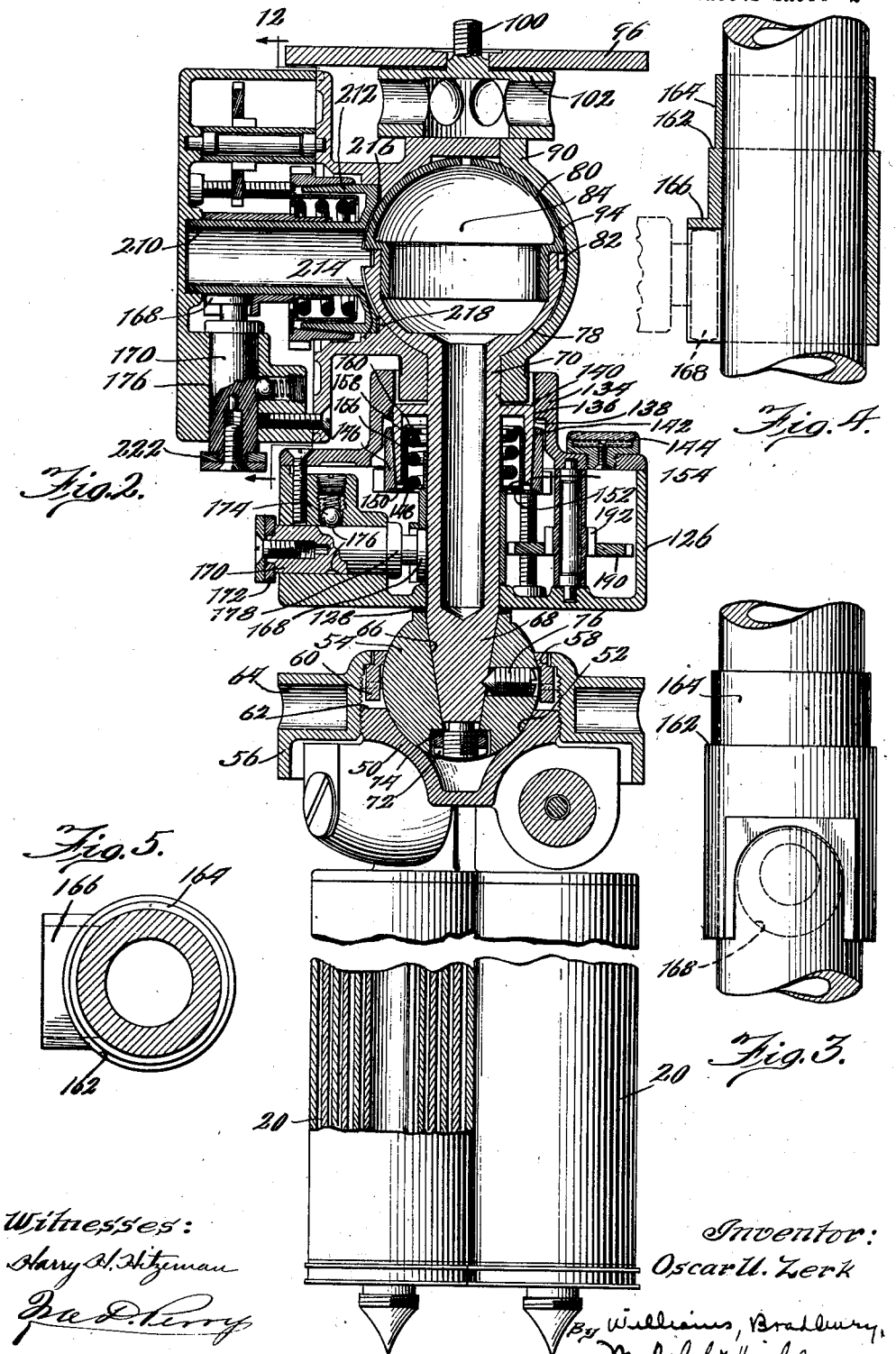
Witnesses:
Harry H. Hitzman
Inventor:
Oscar U. Zerk
By Williams, Bradbury,
McCaleb & Hinkle Attys Nov. 10, 1931.  O. U. ZERK  1,831,086

UNIVERSAL PANORAMIC TRIPOD

Filed Sept. 19, 1927  5 Sheets-Sheet 3

Inventor:
Oscar U. Zerk

Witnesses:

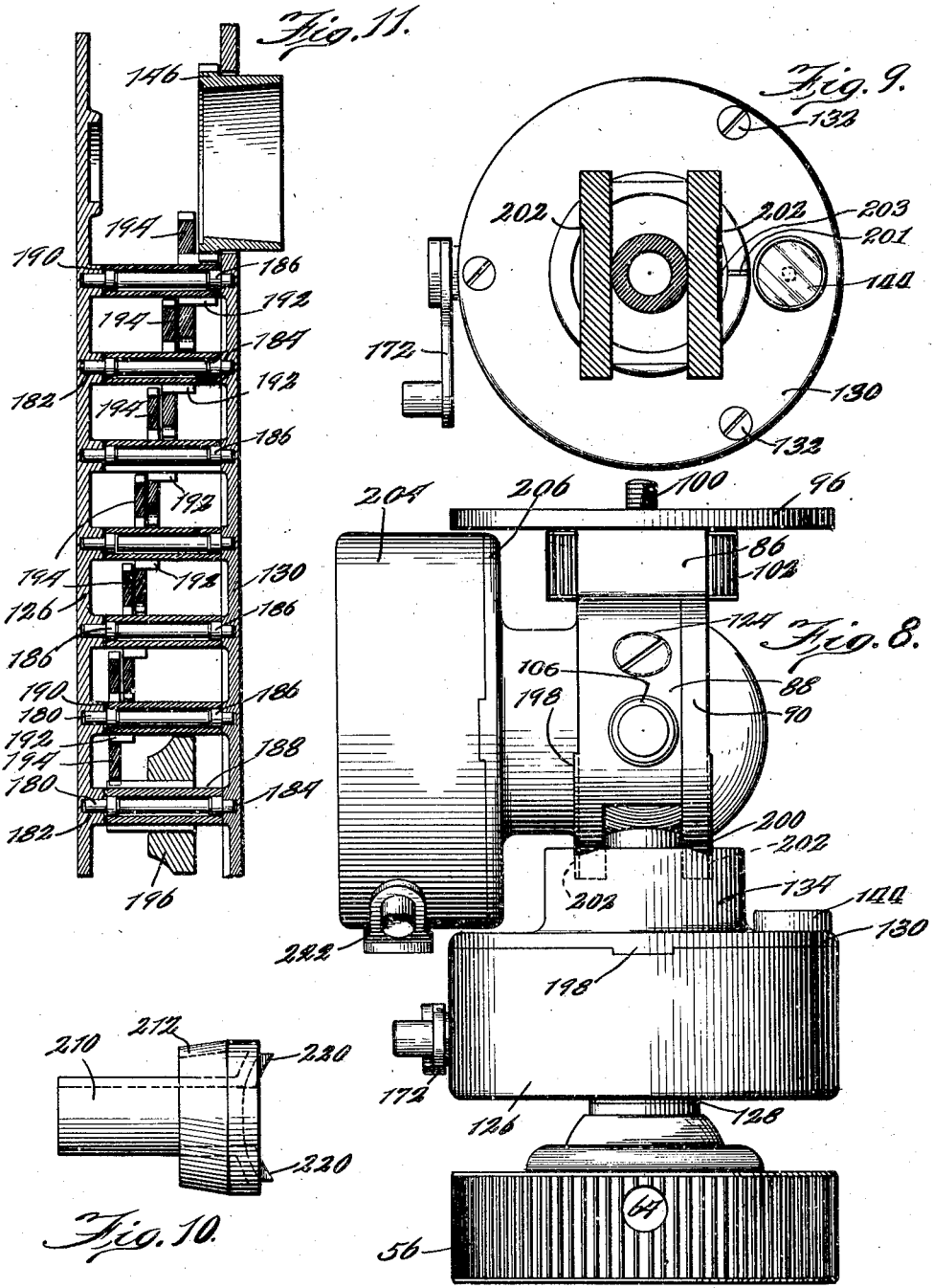

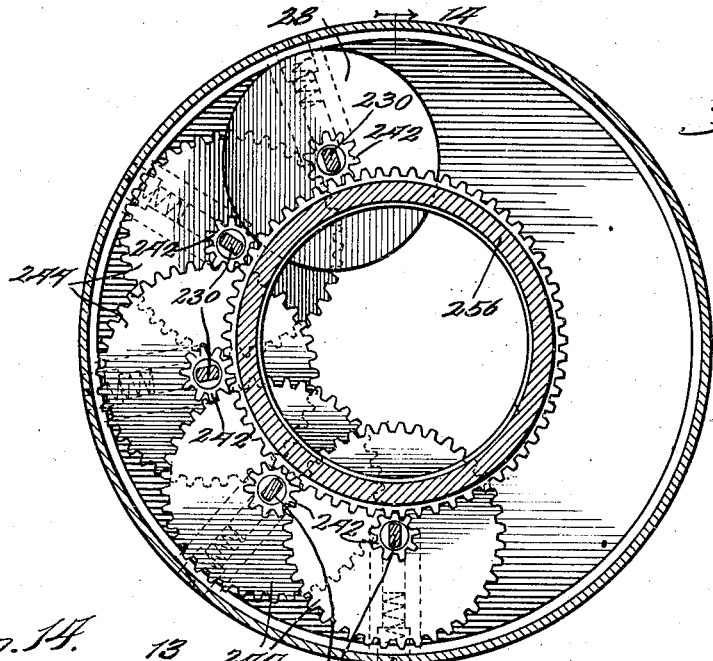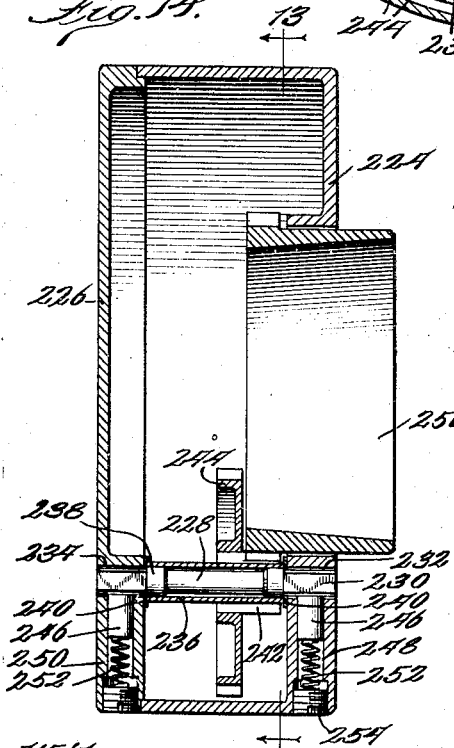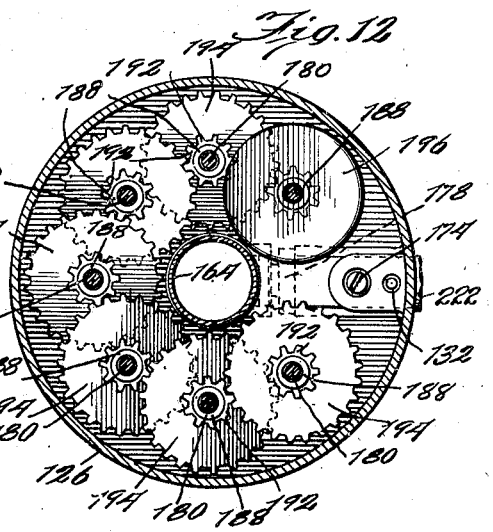

Patented Nov. 10, 1931

1,831,086

UNITED STATES PATENT OFFICE

OSCAR U. ZERK, OF CHICAGO, ILLINOIS

UNIVERSAL PANORAMIC TRIPOD

Application filed September 19, 1927. Serial No. 220,498.

My invention relates generally to apparatus for motion picture photography, and more particularly to a novel form of tripod head for use in taking panoramic motion pictures. The tripod head is especially designed for amateur use, although with slight modifications the principles thereof may readily be adapted for use in the making of tripod heads for professional use. The principal use of my invention is in motion picture cameras, although it may be used in connection with the mounting of other instruments.

In taking motion pictures it is frequently necessary or desirable to focus the camera on a horizontally or vertically moving object, or to take a panoramic view of an object, all of which would not appear within the field of the camera if held stationary. My invention contemplates the provision of novel improved means for mounting a camera so that such views may easily be photographed.

For convenience the horizontal or traversing rotation of the camera will be referred to as "pan" and the vertical or elevational rotation will be referred to as "tilt". In the "pan" and "tilt" of the camera it is highly desirable that some means be used to steady the motion of the camera so as to prevent the reproduction of the view being taken, from appearing jerky and uneven. The tripod head of my invention includes a novel form of such means. My improved tripod head not only provides means for steadying the motion of the camera in "pan" and "tilt" views, but is also adapted to steady the motion of the camera in taking panoramic views in planes which are not exactly horizontal or vertical, for example, as in photographing a person walking up a stairs or hill.

Among the objects of my invention are:

First: To provide a novel improved mechanism for supporting a motion picture camera, or similar instrument, by which the camera may be manually moved steadily in rotating the camera or instrument about an axis of any desired direction.

Second: To provide improved means for limiting movement of the camera to rotation about a vertical axis.

Third: To provide improved selective means for frictionally connecting and disconnecting the rotation steadying means to the camera support.

Fourth: To provide improved means for leveling the camera and clamping it in level position.

Fifth: To provide improved means for guiding the camera supporting mechanism for rotation about a horizontal axis, when taking a "tilt" view.

Sixth: To provide an improved ball and socket connection in a tripod head in which the socket fits with minimum clearance about the ball, and contacts therewith only at the polar surfaces thereof.

Seventh: To provide means in a ball and socket connection on a tripod head for taking up any play or lost motion which may be present between the ball and socket.

Eighth: To provide an improved means for holding the camera supporting means against movement about a horizontal axis when taking a "pan" view.

Ninth: To provide a universally movable support for a camera or other instrument in which there is the minimum of play or "shake" between the parts whereby the camera may be held rigidly when in use.

Tenth: To provide an improved universally adjustable foot for use on tripod legs.

Eleventh: To provide a tripod head which is simple in construction, which may be easily assembled and economically manufactured, which is light in weight, of relatively small overall dimensions, and which may be easily operated.

Other objects will appear from the following description, reference being had to the accompanying drawings, in which:

Fig. 1 is a side elevation of the tripod head of my invention, the head being shown as supported by three tripod legs;

Fig. 2 is a central vertical section of the tripod head taken on the line 2—2 of Fig. 1;

Fig. 3 is a side elevation of the clutch operating sleeve shown in relation to the central post;

Fig. 4 is a central vertical section of said clutch operating sleeve taken on the line 4—4 of Fig. 3;

Fig. 5 is a plan view of the clutch operating sleeve taken on the line 5—5 of Fig. 3;

Fig. 6 is a right side elevation of the lower portion of the tripod head, the upper portion thereof being shown in central vertical cross section;

Fig. 7 shows the detailed structure of the foot of the tripod leg, in central vertical cross section;

Fig. 8 is a front elevation of a tripod head, with the operating handle removed;

Fig. 9 is a horizontal cross sectional view taken on the line 9—9 of Fig. 2;

Fig. 10 is a detail plan view of the element used in guiding the camera supporting plate for rotative movement about a vertical axis;

Fig. 11 is a developed sectional view of the speed increasing gearing of the flywheel controlled steadying mechanism;

Fig. 12 is a sectional view of the camera steadying flywheel and gearing mechanism taken on the line 12—12 of Fig. 2, the central sun gear being omitted for the sake of clearness;

Fig. 13 is a view similar to that of Fig. 12, but showing a modified form of gearing in which means is provided to take up lost motion between the various elements of the train of gearing;

Fig. 14 is a cross sectional view of the modified flywheel and gearing steadying mechanism taken on the line 14—14 of Fig. 13, several parts being omitted for the sake of clearness; and Fig. 15 is an elevation of one of the outer leg sections with the spacing band thereof shown partially in section.

The tripod illustrated in the accompanying drawings includes generally the following structures:

(1) The supporting tripod legs with their universally connected feet, which structures and improvements thereof are disclosed and claimed in my co-pending applications, Serial Nos. 55,350 now Patent No. 1,672,596, dated June 5, 1928, and 55,352 filed September 9, 1925, and Serial No. 208,219 filed July 25, 1927 now Patent No. 1,798,513, dated March 31, 1931; (2) the leveling mechanism whereby the axis of rotation for "pan" views may be adjusted, and other features of the ball and socket connection which are disclosed and claimed in my co-pending application, Serial No. 208,220 filed July 25, 1927 now Patent No. 1,798,446, dated March 31, 1931; (3) the handle means for manually moving the camera freely and locking it in adjusted position which is disclosed in said co-pending application, Serial No. 208,220; (4) the flywheel steadying gearing and mechanism which are also disclosed and claimed broadly in said co-pending application, Serial No. 208,220; and (5) the means for connecting and disconnecting the flywheel steadying mechanism so as to render the same inoperative or operative.

As illustrated in Figs. 1, 2 and 6, the tripod head of my invention is adapted to be supported upon legs 20, each of which is composed of a plurality of telescoping tubular sections 22, which are flared at their upper ends and are complementally inwardly tapered at their lower ends, there being sufficient clearance between sections that they may fall freely relative to each other so that by the impact of momentum the flared portion of each section (except the outermost section) may frictionally wedge itself into the inwardly tapered portion of the next adjacent outer section to form a rigid, automatically collapsible leg.

As shown in Fig. 15, each of the outer leg sections has a rib 173 formed adjacent the lower end of its cylindrical portion. This rib properly spaces the legs and holds them apart while they are being extended and collapsed, thereby preventing interference between the sections and permitting each to be extended and collapsed independently. If desired, a band of metal or other material may be pressed over the outer section as a substitute for the rib 173.

It will be understood that the tripod legs are collapsed by a sudden axial blow which breaks the frictionally wedged joints formed between the complementally tapered portions of adjacent leg sections. In thus telescopically collapsing the legs it has been found that the upper ends of the inner sections tend to become burred due to the fact that they are not coaxial with respect to the outermost leg section and the head piece. I have therefore provided means for centering the innermost section and consequently also roughly centering the intermediate sections. This means comprises a hardened downwardly projecting pointed guide 101 which is secured to a depending lug 103 which is formed integrally with the header and hinge lug 105. The lug 103 initially has a diametrical slot extending upwardly from its lower end.

A U-shaped spring 107, which is adapted frictionally to hold the innermost leg section 22 in position when the leg is completely telescoped or collapsed, rests in the upper end of the slot. The spring 107 is then retained in position by closing the slot by pressing together the lower end portions of the depending lug 103. These portions are then turned so as to be cylindrical and have an undercut annular groove 109 formed therein. The pointed guide 101 is then slipped over the lower end portions of the lug and is secured thereto by pressing its upper edge into the groove 109.

In Fig. 7 I have shown in detail the preferred form of foot which may be used upon the tripod leg. It comprises a header 24 which may be considered the equivalent of the lower end of any tripod leg, and which is axially bored to receive a point 26 and its flange 28. The cylindrical portion 30 of the point is striated or otherwise roughened and firmly pressed into the bore of the header 24. The metal of the header is then pressed around and partially beneath the flange 28, thus more firmly holding the point within the header. The point is threaded at 32 to receive a member 34, which in turn is threaded into a ball 36. A foot-piece 38 is secured to said ball for universal movement relative thereto by means of an inwardly flanged nut 40 engaging the ball above its center. A pad 42 of rubber or similar material may be vulcanized or otherwise secured to the lower surface of the foot-piece 38. The bottom of this pad is preferably serrated or roughened so as to obtain better frictional contact with a supporting surface. A spring pressed plunger 44 having a cylindrical portion 46 guided in a suitable bore in the member 34 engages the concave surface 48 of the foot-piece 38 and through its frictional contact therewith exerts a frictional drag and thus tends to hold the foot-piece stationary. The members 34 may readily be unscrewed to permit outdoor use of the tripod on uneven ground, while when attached, the rubber pads 42 form a secure support for the legs, which will not permit them to slip upon smooth floors when the tripod is used indoors.

The upper ends of the tripod legs are hingedly joined to a head plate 50 which has a spherical concavity 52 adapted to receive a ball 54. The ball may be clamped in any desired position relative to the head plate by means of a nut 56 threaded upon the head plate and which is adapted, through a clamping ring 58, firmly to secure the ball against movement in the concavity or socket 52. The ring 58 has a pair of diametrically oppositely disposed lugs 60, which depend into complementary slots 62 formed in the head plate 50 and thus prevent rotation of the ring. The nut 56 has a plurality of radially drilled holes 64 which are adapted to receive the end of a rod by which a greater leverage may be exerted upon the nut. The ball 54 has an inwardly and downwardly tapering bore 66 to receive a complementally tapered end portion 68 of a hollowed post 70. The post is drawn into said bore by a kerfed nut 72 threaded over the lower extremity of the post, a lock washer 74 being interposed between the nut and the ball to maintain the post firmly fixed in the ball. As an additional means for precluding the possibility of play between the post and the ball a set screw 76 may be threaded in the ball to engage the post.

The upper end of the post 70 terminates in a hollow hemispherical shell 78 into which a hemispherical hollow cap 80 is pressed. A horizontal great circle groove 82 is formed in the external surface of the ball, the whole of which, for convenience, will be designated 84. A socket member 86, formed in two parts 88 and 90 which are fixed together by four screws 92, (Fig. 6) fits over the ball and is universally movable thereon. A relatively wide zone within the socket member 86 is cut away as shown at 94 (Fig. 2) so that the member normally bears against the ball only at the top and bottom portions thereof, thus making a more rigid connection and decreasing the possibility of having a variable coefficient of friction between the parts. An instrument mounting plate 96 is fixed at the top of the member 86 by screws 98 and serves as a keeper for a screw 100 which is adapted to be threaded into the camera or other instrument. The latter screw has an enlarged head 102 which is axially bored for lightness and has a plurality of radially drilled holes 104 into which a handle or rod may be inserted to obtain the desired leverage when attaching or detaching the instrument. The outer cylindrical surface of the head of this screw may be striated as shown or otherwise roughened so that it may be easily manipulated.

The member 86 has a forwardly projecting boss 106 (Fig. 6) which is internally bored and threaded to receive an operating handle 108 which is adapted to be screwed into the boss and clamped thereto by means of a sleeve lock nut 110. The inner end portion 111 of the handle is cylindrical in shape so that it may be used as a lever in tightening and loosening the screw 100 and the nut 56, and its extremity is spherically concave to conform to the shape of the ball 84. Thus, by loosening the sleeve nut and screwing in the handle the socket member 86 may be rigidly clamped to the ball, and by unscrewing the handle sufficiently to release its extremity from contact with the ball, and then tightening the sleeve lock nut 110, the handle will be rigidly connected to the member 86 and may be used to swing or rotate the camera freely about the center of the ball. As shown in Fig. 1, the outer end portion 112 of the handle is roughened and fits into a finger piece 114 which has diametrically opposed wings 116 for convenience in manipulation of the handle.

The socket member 86 is bored and threaded at 118 (Fig. 6). A double concave disc 120 is pressed against the surface of the ball 84 by a spring 122 which is compressed by a retainer 124 threaded in the bore 118. This disc, through the pressure it exerts upon the ball, takes up any play which may be present between the ball and its socket member and thus makes the connection more rigid.

The means for steadying the rotative movement of the camera in taking panoramic views will now be described. I employ two steadying mechanisms, one of which is inoperative in taking "pan" views, and the o her of which is inoperative in taking "tilt" views. Both mechanisms are operative when taking panoramic views in planes other than the horizontal or vertical. The mechanism which is operative in taking panoramic views in a horizontal plane, or in a direction having a component in a horizontal plane, is enclosed within a casing 126 which is mounted so as to be rotatable about the post 70 and rests upon the ball 54, a pair of hardened steel washers 128 being interposed between the casing and the ball to reduce the friction. A casing cover 130, secured to the casing by screws 132, has an upwardly projecting hollowed hub 134, a portion 136 of the inner surface of which bears upon the external cylindrical surface of a flange 138 formed integrally with the post 70 and which comprises an outwardly projecting horizontal por ion 140 and a depending hollow substantially cylindrical portion 142, the outer surface of which has a slight inward taper except where it contacts with the hub 134.

A small spirit level 144 is threaded in the cover 130, serving as an aid when leveling the head by adjustment of the position of the ball 54.

A sun gear 146, forming part of a planetary system of gearing which will be hereinafter described, has a tapered bore of the same angle as the taper of the portion 142 of the flange 136, and with said flange portion forms a friction clutch. The sun gear may be forced upwardly into frictional engagement with the flange portion 142 through a substantially tubular cage 148 having an outwardly extending annular flange 150 and a similar inwardly extending flange 152 at its lower end. The flange 150 serves as a support for the sun gear 146 which is grooved to fit thereover, while the flange 152 serves as a stop to limit downward movement of a flat washer 154, which is normally resiliently held in the position shown by a relatively strong helical compression spring 156, the upper end of which abuts against a washer 158. The latter washer is retained in the cage 148 by the inwardly extending eyeletted flange 160 thereof. The cage, two washers, and the spring are pre-assembled, with the spring initially compressed.

The lower washer 154 rests upon a shoulder 162 of a sleeve 164 which is axially and rotatably movable with respect to the post 70. This sleeve has a sidewardly projecting boss 166 (Figs. 3, 4 and 5) adjacent its lower end, which is drilled and slotted to form a yoke for an eccentric 168. The eccentric is integral with its shaft 170 which is rotatably mounted in the casing, its axis being radial with respect to the post 70. A manually operable lever 172 is rigidly secured to the shaft 170. A spring pressed ball detent 174 tends to prevent rotation of the shaft when the ball is pressed into one or the other of two diametrically oppositely disposed depressions 176 in the shaft, which register with the detent when the lever is thrown into either right or left hand horizontal position, indicated by the words "Off" and "On" marked upon the cylindrical surface of the casing 126 (Fig. 1). Axial movement of the shaft 170 is prevented by the post 70 and an annular shoulder 178 on the shaft. In Figs. 1 and 2, the parts are shown in the positions assumed when the lever 172 is in the "Off" position, that is, with the sun gear free to rotate relative to the post 70. When the lever is swung through an angle of 180° to the "On" position, the eccentric 168 raises the sleeve 164 which through its shoulder 162, the washer 154, the spring 156, washer 158, and cage 148, resiliently forces the sun gear upwardly into frictional clutching engagement with the tapered outer surface of the flange 138. This clutch and clutch operating mechanism is relatively simple in construction, and takes up very little space and may be easily assembled and is readily accessible for inspection or repair.

As previously intimated, the sun gear 146 forms part of a train of speed increasing gearing which together with a flywheel is used to steady the rotative movement of the camera in taking "pan" views. As best shown in Figs. 11 and 12, a plurality of spindles 180, here shown as seven in number, are secured between the casing 126 and the cover 130, their ends being held in sockets 182 and 184 formed in the casing and cover respectively. The spindles each have bearing surfaces 186 of enlarged diameter, formed adjacent their ends. Sleeves or tubular shafts 188 are rotatably mounted on the spindles, and hardened steel washers 190 provided to form friction reducing end thrust bearings between the sleeves and the casing 126. Each of these sleeves 188, with the exception of the last of the series, has a small pinion 192 formed integrally therewith, and a larger gear 194 secured thereto.

To facilitate the making of these sleeves, gear and pinion assemblies, I have devised a novel method of manufacture. Starting with a rod of approximately the same diameter as the outside diameter of the pinions, teeth are first cut the full length of the rod by milling, or other well known method. The rod is then cut to the desired length and all of the teeth, except a portion twice the face of the pinion 192 desired, are turned off. The gear 194 having its bore punched or broached to conform to the outline of the pinion is then pressed over the pinion until its side lies flush with one side thereof.

The gears 194 and pinions 192 form a speed increasing train of gearing in a well known manner, the first pinion of the series meshing with the sun gear 146, and the last sleeve of the series carrying a flywheel 196 which may be secured to the sleeve in a manner similar to that employed in securing the gears to the sleeves.

Assuming the sun gear 146 to be frictionally held stationary, (the lever 172 having been turned to its "On" position) rotation of the casing 126 and its cover 130 which is constrained to rotate therewith by lugs 198 which fit in corresponding slots in the casing, will set the gear train in motion, since the first pinion 192 of the series will have an epicyclic or planetary movement about the sun gear 146. Due to the large gear ratio, the flywheel 196 will rotate at a very high speed, and as a result of its inertia, will exert a sufficiently large force materially to retard accelerative and decelerative rotational movement of the casing and its cover. The flywheel thus steadies the movement of the camera, making it impossible, with an exception hereinafter to be explained, to move the camera in an uneven, jerky manner with the result that the reproduced motion pictures will appear smooth and without the sudden shifts of view so frequently observed.

As best illustrated in Figs. 2, 8, 9 and in dotted lines in Fig. 6, the socket member 86 has a pair of oppositely disposed plane arcuate shaped guiding surfaces 198 and 200 formed at the lower part thereof, which slide in a slot 202, which may best be described as having been cut by a cylindrical milling cutter, of a length equal to the distance between the surfaces 198 and 200, disposed diametrically across the hub 134, with the hub fed toward the cutter in a direction coincident with the axis of the hub. This milled slot thus serves as a guide for the socket member, permitting free rotation thereof about a horizontal axis of the ball 84, but preventing rotation thereof relative to the cover 130 and casing 126 about a vertical axis. A shallow radial groove 203 may be cut in the surface 200, or a line etched thereon, and a horizontal radial line 201 formed upon the top surface of the hub 134, these grooves or lines to indicate by their registry that the camera supporting plate is level.

The inertia steadying means operable upon rotation of the socket member about a horizontal axis, as when taking "tilt" views, is contained within a casing 204 which is secured to a cover 206 formed integrally with the socket member 86 by three screws 208. A tubular element 210 (Fig. 10) having a flange 212 shaped similar to the flange 138, is rotatably mounted in the casing 204 having a bearing at the shoulder 214 formed in the socket member 86. A hardened steel washer 216 lies between the inner end of the element 210 and a second shoulder 218 in the socket member. The inner end of the tubular member is concave and spaced slightly away from the ball 84, but is prevented from rotation with respect to the ball by a pair of arcuate lugs 220 which lie within the groove 82 of the ball. These lugs permit the socket member 86 to be moved rotatively about a vertical axis in taking "pan" views, but make it possible to obtain relative rotation between the socket member and the tubular element 210 when taking "tilt" views. This relative rotational movement is transmitted through speed increasing gearing to a flywheel by mechanism, similar to that above described with reference to steadying the "pan" of the camera, and serves as a steadying means for the "tilt" of the camera. The "tilt" steadying mechanism may be engaged and disengaged by a lever 222 which is similar to the lever 172 and operates in a similar manner. The remaining parts of the "tilt" steadying mechanism are exactly similar to the corresponding parts of the "pan" steadying mechanism, and are therefore designated by similar reference characters. Further detailed description thereof is, therefore, believed to be unnecessary.

In utilizing the tripod head of my invention for the support of large size professional motion picture cameras, I preferably employ means within the "pan" and "tilt" steadying mechanism for taking up the play or backlash in the train of the speed increasing gearing. I have illustrated such means in Figs. 13 and 14. The gearing is mounted within the casing 224 which is closed by a cover plate 226. The ends of spindles 228 have flattened portions 230, as best illustrated in cross section in Fig. 13, and are mounted in elongated slots 232 and 234 formed within the casing 224 and cover 226 respectively. These slots extend radially so that the spindle is capable of slight lateral movement, radial with respect to the casing. A sleeve 236 is rotatably mounted on each of the spindles 228, bearing upon short portions 238 of enlarged diameter. Hardened steel washers 240 reduce the friction between the ends of the sleeve and the casing and cover. Pinions 242 may be formed integrally with the sleeve 36, as previously described, and a gear 244 pressed upon the pinion. A pair of plungers 246 guided for axial movement within radial bores 248 and 250 in the casing 224 and cover 226, respectively, have their inner end portions shaped to conform to the cylindrical surface of the end portions of the spindle 228. These plungers normally tend to move the spindle radially inwardly relative to the casing, being impelled by springs 252 which are retained within the bores 248 and 250 by screws 254. A sun gear 256 meshes with the first pinion 242 of the series and, in a manner similar to that previously described with reference to Figs. 11 and 12, is capable (upon rotation of the casing with respect to the sun gear) of imparting motion to the train of speed increasing gearing.

It is, of course, highly desirable to have the minimum of play in this train of gearing since a relatively small amount of play between each pair of meshing teeth will in the aggregate make possible considerable play between the sun gear 256 and its casing 224, with the consequent result of materially decreasing the steadying efficacy of the mechanism. By having each of the spindles pressed inwardly along planes converging at the axis of the sun gear, the teeth of the gears and pinions will always be retained fully in mesh with each other so that play or back-lash between the gears and pinions will be eliminated. Since the effect of play in the gear train at the pinions nearest the flywheel 258 is much less than the effect of play between the sun gear and the first pinion of the series, the means for resiliently forcing the pinions and gears in tight mesh with each other, for the last three spindles of the series, may be omitted without greatly increasing the play or back-lash of the train of gears as a whole.

In the use of the tripod head of my invention the head plate 50 is first roughly leveled by adjusting the positions of the tripod legs, and the post 70 is then brought to an exactly vertical position by adjusting and then clamping the ball 54 in its socket. The spirit level 144 will indicate when the axis of the post 70 is exactly horizontal, whereupon the ball 54 may be clamped in its socket 52 by screwing down the nut 56, using the handle 108 as a lever if desired. Having attached the camera by means of the screw 100, the device is ready for use.

The method of operation followed when it is desired to take a plurality of separate views in different directions, with the camera held stationary during the taking of each view, will now be described. The levers 172 and 222 are each turned to the "off" position, if not previously thus adjusted, and the handle 108 screwed outwardly to the position approximately as shown in Fig. 6. The camera may then be pointed in any desired direction by means of the handle 108 and locked in the desired position by turning the handle to bring its spherically concave extremity into clamping contact with the outer surface of ball 84. By turning the handle 108 about a half turn clockwise, the socket member 86, and hence the camera, may be rigidly clamped in a fixed position or by turning the handle counter-clockwise be free to move relative to the ball.

If it is desired to take panoramic views without the use of the inertia controlled steadying mechanism, the locking nut 110 is turned up against the boss 106 thereby rigidly holding the handle in the socket member. The camera may then be moved in any desired direction at any desired speed by swinging the operating handle.

If it is desired to take a horizontal panoramic view, the "pan" steadying mechanism is frictionally connected to the flange 138 by turning the lever 172 to the "on" position, whereupon rotation of the socket member 86, and hence the camera, about a vertical axis of the post will cause the first pinion 192 of the series of speed increasing gears to rotate with respect to the sun gear and thereby cause rotation of the flywheel 196. The inertia of the flywheel and the train of gearing will, of course, tend to retard rapid acceleration of the rotative motion of the camera, and will also tend to maintain the speed after rotation of the camera has commenced by retarding deceleration. It will, therefore, compensate for the irregularities of the manual force applied upon the handle 108 to rotate the camera. If, however, it is desired suddenly to shift the camera or to stop it suddenly, as for example when photographing an automobile which is suddenly stopped, the inertia steadying mechanism will be automatically disconnected, due to the fact that the sun gear 146 is held in frictional engagement with the flange 142 by the spring 156 so that whenever a sudden powerful force is exerted upon the operating handle the sun gear will slip with respect to the flange.

When it is desired to take a "tilt" view the lever 222 is thrown to the "on" position, thereby frictionally connecting the sun gear of the tilt steadying mechanism with the flange 212 of the tubular element 210. If desired the "pan" steadying mechanism may be left in operative position so that its inertia will serve as a retardant to prevent deflection of the camera from the true vertical plane. When taking the "tilt" view the casing 204 will rotate with respect to the element 210 which is held against rotation relative to the ball 84 by the inter-engagement of the lugs 220 in the groove 82. As previously described this relative rotation between these parts is transmitted through the speed increasing gearing to a flywheel which has the effect of retarding rapid acceleration and deceleration in the movement of the socket 86 with respect to the ball 84.

When taking a panoramic view in a plane other than the vertical or horizontal, both steadying mechanisms are rendered operative by throwing the levers 222 and 172 to their "On" positions, whereupon movement of the socket member in any plane other than the horizontal or vertical will cause rotation of both of the flywheels in the steadying mechanisms. The combined retarding force of the two steadying mechanisms will be slightly greater than the retarding force of one of them, as when taking a horizontal or vertical panoramic view, but due to the fact that the component of the velocity of rotation which is transmitted to these mechanisms respectively will be considerably less than the velocity of rotation transmitted to one of said mechanisms when taking either a "pan" or "tilt" view the difference in the retarding force will not be great and the two steadying mechanisms will tend to cause rotation of the camera to continue in the plane of its incipiency.

While I have shown and described particular embodiments of my invention, I do not wish the scope thereof to be limited to the particular construction illustrated. Various modifications may be made without departing from the principles of my invention.

I claim:

1. In a device of the class described, the combination of a post adapted to be fixed in vertical position and having a ball at its upper end, a camera supporting socket member universally mounted upon said ball, a casing secured to said member, gearing means in said casing adapted to steady rotative movement of said member relative to said ball about a horizontal axis, said means, including a sun gear, an element cooperating with said ball and thereby prevented from rotating with said socket member when the latter is rotated about a horizontal axis, and manipulative means for connecting said sun gear to said element, whereby said gearing means may be rendered operative.

2. In a device of the class described, the combination of a post adapted to be fixed in vertical position, a ball having a horizontal groove in its outer surface, an instrument supporting socket member fitting over said ball, a casing secured to said member, inertia controlled steadying mechanism in said casing, an element having means engaging the groove in said ball, and means for connecting said mechanism to said element to render said mechanism operative.

3. In a device of the class described, the combination of a stationary element having a horizontally grooved ball at its upper end, an instrument supporting socket member universally mounted on said ball, an element carried by said member and having a lug permanently disposed and slidable in the groove in said ball, and manipulative means for connecting said member to said element, thereby preventing free rotative movement of said member about a horizontal axis and relative to said ball, but permitting free rotative movement thereof about a vertical axis.

4. In a device of the class described, the combination of a post adapted to be fixed in vertical position and having a ball at its upper end, a camera supporting socket member universally mounted upon said ball, a casing rigidly connected to said member, gearing means in said casing adapted to steady rotative movement of said member relative to said ball, an element stationary with respect to said ball, and manipulative means for connecting said means to said element, whereby said gearing means may be rendered operative.

5. In a device of the class described, the combination of a stationary ball, a camera supporting socket member universally mounted upon said ball, a casing rigidly connected to said member, gearing means in said casing adapted to steady rotative movement of said member relative to said ball about a vertical axis, an element stationary with respect to said ball and manipulative means for connecting said means to said element, whereby said gearing means may be rendered operative.

6. In a device of the class described, the combination of a post, a ball fixed relative to said post and having a horizontal groove in its outer surface, an instrument supporting socket member fitting over said ball and universally movable with respect thereto, a casing secured to said member, inertia controlled steadying mechanism in said casing, an element having means engaging the groove in said ball, and means for connecting said mechanism to said element.

7. In a device of the class described, the combination of a tripod head plate, a post universally connected therewith and adapted to be clamped thereto with its axis vertical, a ball at the upper end of said post, camera supporting means including a socket member fitting partially around said ball whereby said means may be universally moved with respect to said ball, inertia controlled steadying means operative upon rotation of said supporting means about a horizontal axis, inertia controled steadying means operative upon rotation of said supporting means about a vertical axis, and friction clutch means for rendering either or both of said steadying means inoperative.

8. In a device of the class described, the combination of a universally adjustable element, a vertical post carried thereby and having a fixed ball at its upper end, a camera supporting socket member universally mounted on said ball, a casing rotatably mounted on said post, a connection between said socket member and said casing for transmitting only the rotative movement of said member about a vertical axis to said casing, and means for reducing the drag of friction between said casing and said element.

9. In a device of the class described, the combination of a relatively stationary ball, a camera supporting socket member universally mounted thereon, a casing fixed with respect to said member, inertia means in said casing for regulating rotative movement of said socket member about a horizontal axis, an element held against rotative movement about a horizontal axis, and means for reducing the friction between said element and said member.

10. In a device of the class described, the combination of a vertical post having a ball at its upper end, a socket fitting partially around said ball and universally movable relative thereto, a casing rotatable about said post and forming part of a train of planetary gearing, inertia controlled mechanism for steadying rotative movement thereof about said post, and cooperating means on said socket and said casing for transmitting rotation of said socket about a vertical axis to said casing.

11. In a device of the class described, the combination of a sun gear, a casing rotatable relative thereto, a speed increasing gear train including a plurality of gears and pinions mounted so as to be laterally slidable in a direction radial with respect to said sun gear, and resilient means tending to move said gears and pinions in said direction, whereby back-lash may be reduced.

12. In a device of the class described, the combination of a tripod head plate, a post universally connected therewith and adapted to be clamped thereto with its axis vertical, a ball at the upper end of said post, camera supporting means including a socket member fitting partially around said ball, said means being universally movable with respect to said ball, inertia controlled steadying means operative upon rotation of said supporting means about a horizontal axis, inertia controlled steadying means operative upon rotation of said supporting means about a vertical axis, and selective means for rendering either or both of said steadying means inoperative.

13. In a device of the class described, the combination of a universally adjustable post adapted to be fixed with its axis vertical, a ball at the upper end of said post, instrument supporting means universally mounted upon said ball, inertia controlled steadying means adapted to rotate about said post upon rotation of said supporting means about a vertical axis, and manipulative means for forcing an element of said steadying means into frictional engagement with said post.

14. In a device of the class described, the combination of a universally adjustable post adapted to be clamped in vertical position, a ball secured at the upper end of said post, a socket member fitting over said ball and universally movable thereon, said member having a pair of upwardly extending lugs, a camera supporting plate secured upon said lugs, and a camera attaching screw extending through said plate and having an enlarged head positioned between said lugs.

15. In a device of the class described, the combination of a stationary element, a member having rotative movement with respect to said element, means including planetary gearing for governing the relative rotational movement between said element and member, and manipulative means comprising a precompressed resilient means for forcing said gearing into engagement with said element, a manually shiftable lever, and cam means operated thereby for exerting additional pressure upon said spring.

16. In a device of the class described, the combination of a relatively stationary ball, a camera supporting socket member universally mounted thereon, a casing fixed with respect to said member and inertia means within said casing for steadying rotative movement of said casing about a horizontal axis through said ball.

17. In a device of the class described, a relatively stationary post, having an outwardly and downwardly extending flange, said flange having a frusto-conical outer surface, a casing rotatable about said post, a camera supporting member universally connected to said post and connected to said casing so as to be non-rotatable about the vertical axis thereof, speed increasing gearing in said casing, a central gear normally rotatable with respect to said flange, having an internal surface complementally to the outer surface of said flange and meshing with said gearing, and resilient pressure means for frictionally connecting said gear to said flange.

18. In a device of the class described, the combination of a universally mounted camera supporting member, means to prevent rapid accelerative and decelerative movement thereof, comprising a casing, a train of planetary speed increasing gearing mounted upon spindles within said casing, a fly wheel geared to the last element of said speed increasing gear train, and a sun gear forming the first element of said gear train; a frictional clutch for rendering such gear train and fly wheel operative, and manipulative means for operating said clutch including an operating member extending radially into said casing between the spindles of the first and last elements of said gear train.

19. In a device of the class described, rotation steadying means comprising a sun gear adapted to be held stationary, a casing rotatable with respect to said sun gear, a plurality of spindles borne by said casing and arranged equi-distant from its axis of rotation, a speed increasing gear train mounted upon said spindles, the first pinion of said train being in mesh with said sun gear and the last pinion of said train having a fly wheel fixed thereto, and manually operable means for frictionally holding said sun gear stationary, said means comprising a member extending radially with respect to said casing and having a cam element adapted to force said sun gear into frictional contact with said stationary member.

In witness whereof, I hereunto subscribe my name this 2 day of September, 1927.

OSCAR U. ZERK.